(12) United States Patent
Volmering et al.

(10) Patent No.: US 12,128,361 B2
(45) Date of Patent: Oct. 29, 2024

(54) MEMBRANE FILTER AND FILTERING METHOD

(71) Applicants: Dirk Volmering, Aachen (DE); Klaus Vossenkaul, Aachen (DE)

(72) Inventors: Dirk Volmering, Aachen (DE); Klaus Vossenkaul, Aachen (DE)

(73) Assignee: MEMBION GMBH Schwerzfelder, Roetgen (DE)

( * ) Notice: Subject to any disclaimer, the term of this patent is extended or adjusted under 35 U.S.C. 154(b) by 0 days.

(21) Appl. No.: 18/599,330

(22) Filed: Mar. 8, 2024

(65) Prior Publication Data

US 2024/0293781 A1 Sep. 5, 2024

Related U.S. Application Data

(63) Continuation of application No. PCT/EP2022/068707, filed on Jul. 6, 2022.

(30) Foreign Application Priority Data

Sep. 9, 2021 (DE) .......................... 102021123363.1

(51) Int. Cl.
*B01D 65/02* (2006.01)
(52) U.S. Cl.
CPC .......... *B01D 65/02* (2013.01); *B01D 2321/18* (2013.01); *B01D 2321/2066* (2013.01)

(58) Field of Classification Search
CPC ................ B01D 65/02; B01D 2321/18; B01D 2321/2066
See application file for complete search history.

(56) References Cited

U.S. PATENT DOCUMENTS

2016/0207004 A1  7/2016  Volmering et al.
2017/0087518 A1  3/2017  Volmering et al.

FOREIGN PATENT DOCUMENTS

| DE | 10161095 C1 | 11/2002 |
| DE | 102013218208 A1 | 3/2015 |
| DE | 102019115265 A1 | 12/2020 |
| DE | 102019129074 B3 | 1/2021 |
| EP | 3388138 A1 | 10/2018 |
| JP | H1066834 A | 3/1998 |

*Primary Examiner* — Bradley R Spies
(74) *Attorney, Agent, or Firm* — Von Rohrscheidt Patents

(57) ABSTRACT

A membrane filter for submerged operation for filtering a liquid, the membrane filter including membrane units and a gas distribution system for distributing a gas to the membrane units and flushing the membrane units, wherein each of the membrane units includes a respective gas inlet opening and at least one membrane element, the at least one membrane element including membranes for filtering a liquid permeate from the liquid, a permeate collection cavity connected to permeate sides of the membranes, and a permeate outlet configured to drain the permeate from the permeate collection cavity, the gas distribution system including exactly one gas outlet for each of the membrane units, the exactly one gas outlet configured to exhaust the gas from the gas distribution system into a respective gas inlet opening of each of the membrane units.

10 Claims, 9 Drawing Sheets

MEMBRANE FILTER AND FILTERING METHOD

RELATED APPLICATIONS

This application is a continuation of International Patent Application PCT/EP2022/068707 filed on Jul. 6, 2022, claiming priority from German Patent Application DE 10 2021 123 363.1 filed on Sep. 9, 2021, both of which are incorporated in their entirety by this reference.

FIELD OF THE INVENTION

The invention relates to a membrane filter for submerged operation for filtering a liquid. The invention also relates to a method for filtering a liquid with a membrane filter configured for submerged operation.

A generic membrane filter and a generic method are known from DE 101 61 095 C1. The membrane units are fed with gas by a tubular distribution manifold arranged below the liquid level. The feed conduits to the membrane units respectively require a throttling feature in order to provide an even gas feed to all membrane units through the tubular distribution manifold. The throttling feature is typically implemented by installing throttling cross sections. The throttling cross sections have to be sized for the smallest design gas flow. Thus, it is a disadvantage that significantly higher-pressure losses occur in the throttling cross sections at higher gas flow rates which increases energy demand.

Since municipal MBR systems have a high variability of through put an adaptation of the filtration power to the variable through puts is detrimental from an energy consumption point of view.

DE 10 2019 129 074 B3 discloses a membrane filter where a respective gas inlet opening into a closed membrane unit is formed by lower opening of a geyser tube that laterally defines the gas collection cavity. An interior of the membrane unit includes a tub shaped gas distribution element above the geyser in order to evenly distribute the gas in the membrane element.

DE 10 2013 218 208 A1 discloses a membrane filter with a finger shaped base element wherein the fingers include a common permeate collection cavity. US 2017/087518 A1 and DE 10 2019 115 265 A1 disclose further membrane units but no distribution of the gas to plural membrane units.

JP-H 10-66834 A discloses a membrane filter including plate shaped membrane units and tub shaped gas distribution elements that evenly distribute the gas into intermediary spaces between the membrane units.

BRIEF SUMMARY OF THE INVENTION

Thus, it is an object of the invention is to propose a membrane filter with a gas distribution system that facilitates even gas distribution and low-pressure losses over a wide variation range of the gas feed.

Improving upon the known membrane filters the object is achieved by A membrane filter for submerged operation for filtering a liquid, the membrane filter including membrane units and a gas distribution system for distributing a gas to the membrane units and flushing the membrane units, wherein each of the membrane units includes a respective gas inlet opening and at least one membrane element, the at least one membrane element including membranes for filtering a liquid permeate from the liquid, a permeate collection cavity connected to permeate sides of the membranes, and a permeate outlet configured to drain the permeate from the permeate collection cavity, the gas distribution system including exactly one gas outlet for each of the membrane units, the exactly one gas outlet configured to exhaust the gas from the gas distribution system into a respective gas inlet opening of each of the membrane units, a downward open tub including a base arranged at a top of the tub and forming a boundary for the gas, and a gas inlet configured to let the gas into the tub, wherein the exactly one gas outlet is configured downward open in a lateral wall of the tub, and the membrane units respectively include a downward open gas collection cavity below the at least one membrane element, and the membrane units respectively include a geyser element below the at least one membrane element, the geyser element including an outlet device configured for a pulsating outlet of the gas in an upward direction from the gas collection cavity, and wherein the geyser element includes the respective gas inlet opening at a bottom of the geyser element.

Therefore, no tubular distribution manifold is required which reduces a pressure loss in the introduced gas and simultaneously facilitates operations with small pressure loss variations over a large variation range of the gas feed.

Thus, a height of the geyser element is used to increase a vertical extension of the tub, wherein the geyser elements are arranged laterally adjacent to the tub so that the gas outlets start shortly above the gas outlets. When performing the method according to the invention with the membrane filter according to the invention the gas flows directly after flowing out of each of the gas outlets of the tub directly and completely into a respective gas inlet opening of the geyser elements.

The gas inlet can be configured slot shaped with parallel edges or upward tapering, e.g. wedge shaped, as a semi-circle or with random curved edges.

The gas is introduced through the gas inlet opening into an interior of the membrane unit in a controlled manner. Various gas inlet openings and adjoining devices for conducting the gas into the interior of the membrane unit are known in the art.

Advantageously the membrane units include the respective gas inlet opening below the base. This feature means that the tub is not placed below but laterally adjacent to the membrane units. This helps to implement tubs with a greater height for a given blow in level. This leads to a significant enlargement of the flow cross section for the gas in the tub which has the advantage that an even distribution of the gas flow can also be assured in significantly longer tubs. This in turn facilitates a significant increase of the number of the membrane units that are supplied with gas from one tub.

According to the invention, two or more membrane elements are installed above the geyser element in the membrane units. These embodiments form so called double decker systems when two membrane elements are respectively installed on top of one another in the membrane units.

The air inlet into the tub can have different positions in the membrane filter according to the invention. The air inlet can be configured as a tubular spout in a very simple embodiment wherein the tubular spout is separate from the tub and lets the gas flow into the tub from below. The tubular spout can also be connected laterally, e.g. at a face of the tub or also at its long side. The tubular spout can also be attached from above at the base of the tub and run the gas through the base of the tub as disclosed in JP-H 10-66834 A.

Thus, it is within the spirit and scope of the membrane filter according to the invention that the membrane elements can be configured with various types of membranes, like, e.g., hollow fiber membranes, plate membranes, pillow membranes or hollow fiber membranes connected to form curtains. The membranes themselves are ultra or micro filtration membranes with pore sizes between 0.02 and 1.0 μm. Other membranes from the field of nanofiltration or low-pressure reverse osmosis can also be used.

When operating the membrane filter according to the invention in membrane bioreactors (MBR) the employed gas is typically air, and the employed membranes are from the field of ultra or micro filtration.

Various configurations of membrane elements are within the spirit and scope of the membrane filter according to the invention. The membranes can be enveloped for example by a tube that is part of the membrane element. This has the advantage that introduced gas cannot exit the area of the membranes laterally and flow up laterally adjacent to the membranes without being used.

When hollow fiber membranes are used, they can be configured according to the invention in double header systems or single header systems. Both configurations of the membrane elements are explicitly within the spirit and scope of the invention. In double header systems the hollow fiber membranes are fixed in the headers at a top and at a bottom. When using a single header design, the membranes are individually closed on top and float in the liquid to be filtered wherein only bases of the membranes are fixed in a base element.

In another advantageous embodiment of the membrane filter according to the invention, each of the gas outlets includes a beak shaped spout configured to conduct the gas outward into an area that is laterally offset from the tub. This is helpful in particular when there is a gap between the membrane units and the lateral wall of the tub, wherein the gas can flow through the gap past the membrane units after exiting from the gas outlets. The inserted beak shaped spouts bridge the gap and an entirety of the gas can flow into the gas inlet opening.

In order to facilitate further conducting the gas flowing out of the gas outlets it is advantageous when the beak shaped spout includes a downward open flow through channel for the gas. Alternatively the flow through channel can be downward closed. The flow through channel is advantageously configured with a narrowest flow cross section in an area of the wall of the tub. This narrowest flow cross section is advantageously configured as short as possible and provided with curved inlet lips so that no sludge particles or contaminants can lodge at any edges of the beak shaped spout when the membrane filter is used in MBR applications. It is also advantageous in this context when the flow through channel expands again in a conical profile downstream of the smallest flow cross section in order to provide minimum resistance for the gas flow.

In another embodiment of the membrane filter according to the invention, the flow through channel is sloped upward on an outside of the tub. This increases the flow velocity in the flow through channel and improves flow through. Alternatively, the flow through channel can be flat or inclined downward on the outside. Then, the flow through channel is always filled with the gas and less prone to contamination.

In an advantageous embodiment of the membrane filter according to the invention, the tub can be made from two bent pieces of sheet metal. The sheet metal pieces can be made, e.g. from stainless steel, and subsequently welded to form the tub or glued with a special glue. This fabrication process facilitates producing very tall and narrow tubs with small pressure losses in a simple manner.

In order to prevent a vibration of the long side walls of tall tubs, it is within the spirit and scope of the invention to provide the tubs with at least one internal connection element between the bent pieces of sheet metal.

In addition to the flow advantages of the tall tubs they have the advantage of an increased static strength with respect to bending. Therefore the tub forms part of a frame in which the membrane units are mounted in an advantageous embodiment of the membrane filter according to the invention. In this embodiment, the height of the tub is used to increase the strength of the entire membrane filter. Thus, the tub can be bolted together, e.g. with side pieces of the frame.

In an advantageous embodiment of the membrane filter according to the invention, a permeate collection channel is arranged at a top of the tub wherein the permeate outlets laterally connect to the permeate collection channel. The connection of permeate collection channel and tub thus facilitates a transfer of the loads and forces from the membrane units to the tub or to the frame of the module. Thus, the permeate collection channel can be made from materials with lower strength, e.g. synthetic materials.

Improving upon a known method it is proposed according to the invention that the gas flows through a gas inlet into a downward open tub in the gas distribution system wherein the gas is contained by a base of the tub on top, wherein the gas outlets are configured downward open in a lateral wall of the tub, and wherein and the membrane units respectively include a downward open gas collection cavity below the at least one membrane element, and the membrane units respectively include a geyser element below the at least one membrane element, the geyser element including an outlet device configured for a pulsating outlet of the gas in an upward direction from the gas collection cavity, wherein the geyser element includes the gas inlet opening at a bottom of the geyser element. The method according to the invention is performed in particular by the membrane filter according to the invention and is characterized by its advantages recited supra.

BRIEF DESCRIPTION OF THE DRAWINGS

The invention is subsequently described based on embodiments with reference to drawing figures, wherein.

DETAILED DESCRIPTION OF THE INVENTION

Figure 1:
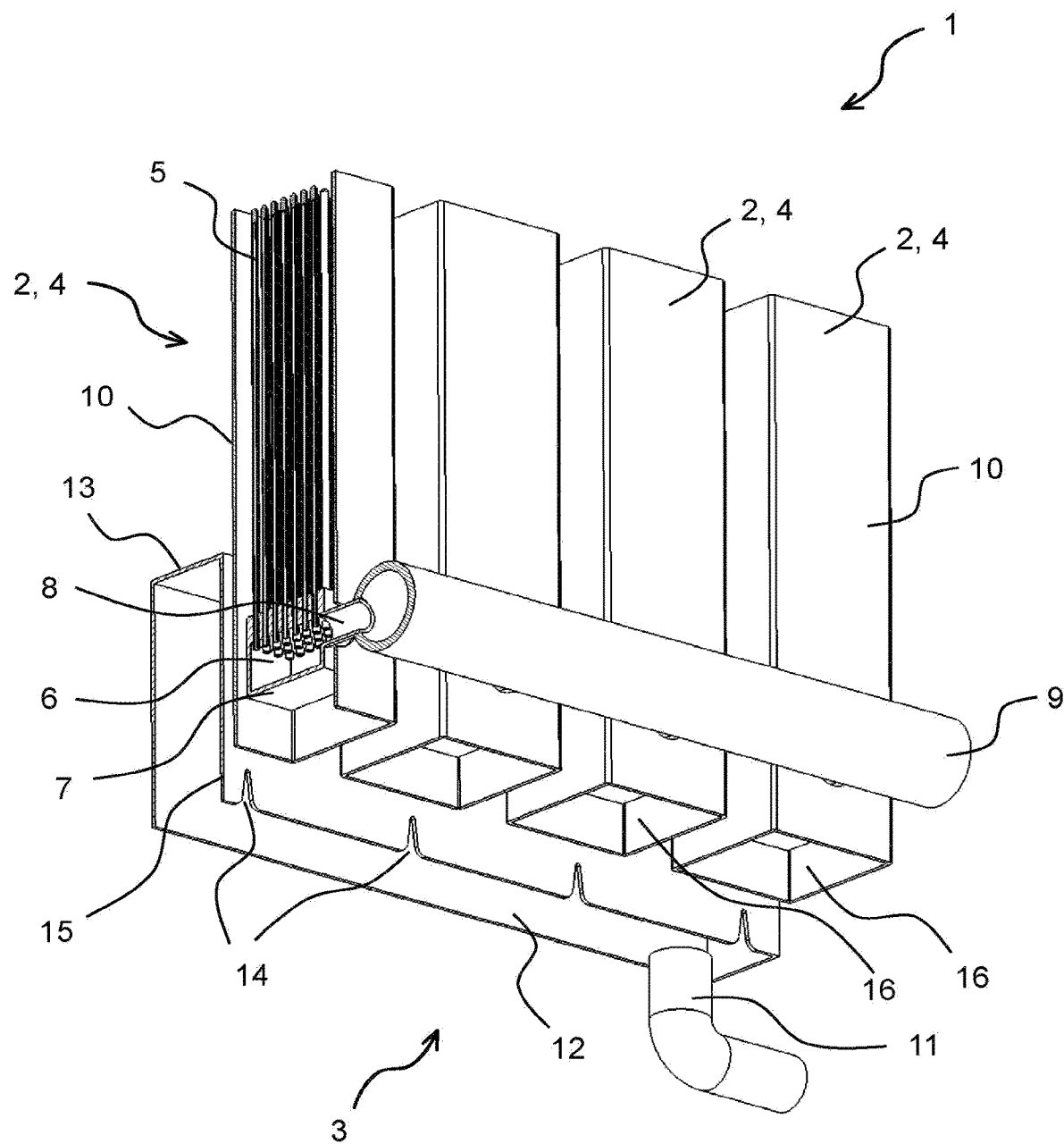
FIG. 1 illustrates a sectional view of a first membrane filter.

The drawing figures are not to scale. Identical reference numerals in different embodiments refer to like or identical elements.

FIG. 1 illustrates a sectional view of a membrane filter 1 including membrane units 2 and a gas distribution system 3. Each of the membrane units 2 includes a membrane element 4. In this case the membrane units 2 are made from exactly one membrane element 4. Each membrane element 4 includes membranes 5 and a permeate collection cavity 6 that is connected at permeate sides of the membranes 5. The membranes 5 are hollow fiber membranes in this case and configured according to the single header principle, this means they are individually closed on top and only fixed in a base element at a bottom of the membranes, wherein the base element 7 includes the permeate collection cavity 6 and a permeate outlet 8 configured to drain the permeate from the permeate collection cavity 6 into a permeate collection channel 9. Additionally, the membrane element 4 includes a rectangular tube 10 that envelops the membranes 5 and the base element 7 and that is laterally penetrated by the permeate outlet 8.

The gas distribution system 3 includes a gas inlet 11 configured for letting gas flow from below into a downward open tub 12 that includes a base 13 on top that forms a boundary for the gas. The gas inlet 11 in the membrane filter 1 is separate from the tub 12. The gas distribution system 3 furthermore includes downward open wedge-shaped gas outlets 14 arranged in a lateral wall 15 of the tub 12 and configured to flow the gas out of the tub 12.

The membrane units 2 in the membrane filter 1 respectively include a gas inlet opening 16 below the base 13. When the membrane filter 1 is operated the tub 12 fills with the gas until the gas flows through the gas outlets 14 from the gas distribution system 3 and then flows through the gas inlet openings 16 into the membrane units 2. The gas inlet opening 16 is the only path for the gas to flow into the respective membrane unit 2.

Figure 2:
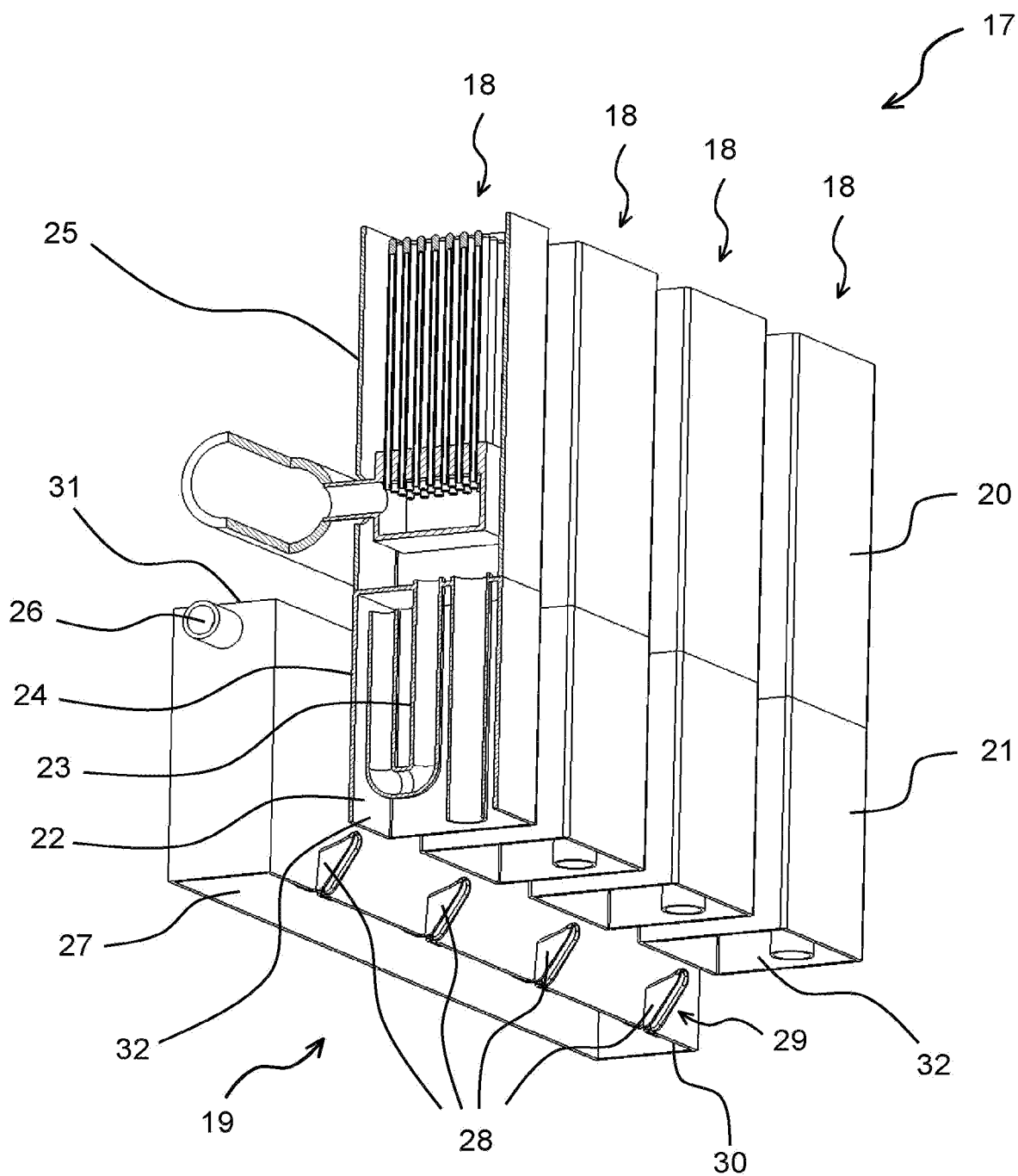
FIGS. 2-5 illustrates sectional views and detail views of a second membrane filter according to the invention.

FIG. 2 shows a view of a second membrane filter 17 according to the invention including four membrane units 18 and a gas distribution system 19. The membrane units 18 respectively include a geyser element 21 respectively below a membrane element 20. The membrane elements 20 are configured identical to the membrane units of the first membrane filter 1.

The geyser element 21 includes a downward open gas collection cavity 22 and an outlet device 23 for pulsating outlet of a gas from the gas collection cavity 22. The geyser element 21 additionally includes a rectangular geyser tube 24 closed on top and open at a bottom and that laterally defines the gas collection cavity 22. The rectangular geyser tube 24 has the same cross section as the rectangular tube 25 of the membrane element 20.

The gas distribution system 19 of the second membrane filter 17 according to the invention includes a gas inlet 26 connected at a face of a downward open tub 27 and configured to let the gas into the tube 27. Additionally, the gas distribution system 19 includes four beak shaped spouts 28 that are inserted into wedge shaped gas outlets 29 in a lateral wall 30 of the tub 27 covered by the beak shaped spouts which conduct the gas outward into an area offset from the tub 27.

The membrane units 18 according to the invention include a gas inlet opening 32 below a base 31 of the tub 27 not illustrated in the sectional view. The gas inlet opening 32 simultaneously forms the open lower side of the rectangular geyser tube 24 of the geyser element 21. The gas inlet opening 32 is the only inflow option for the gas into the respective membrane unit 18.

Figure 3:
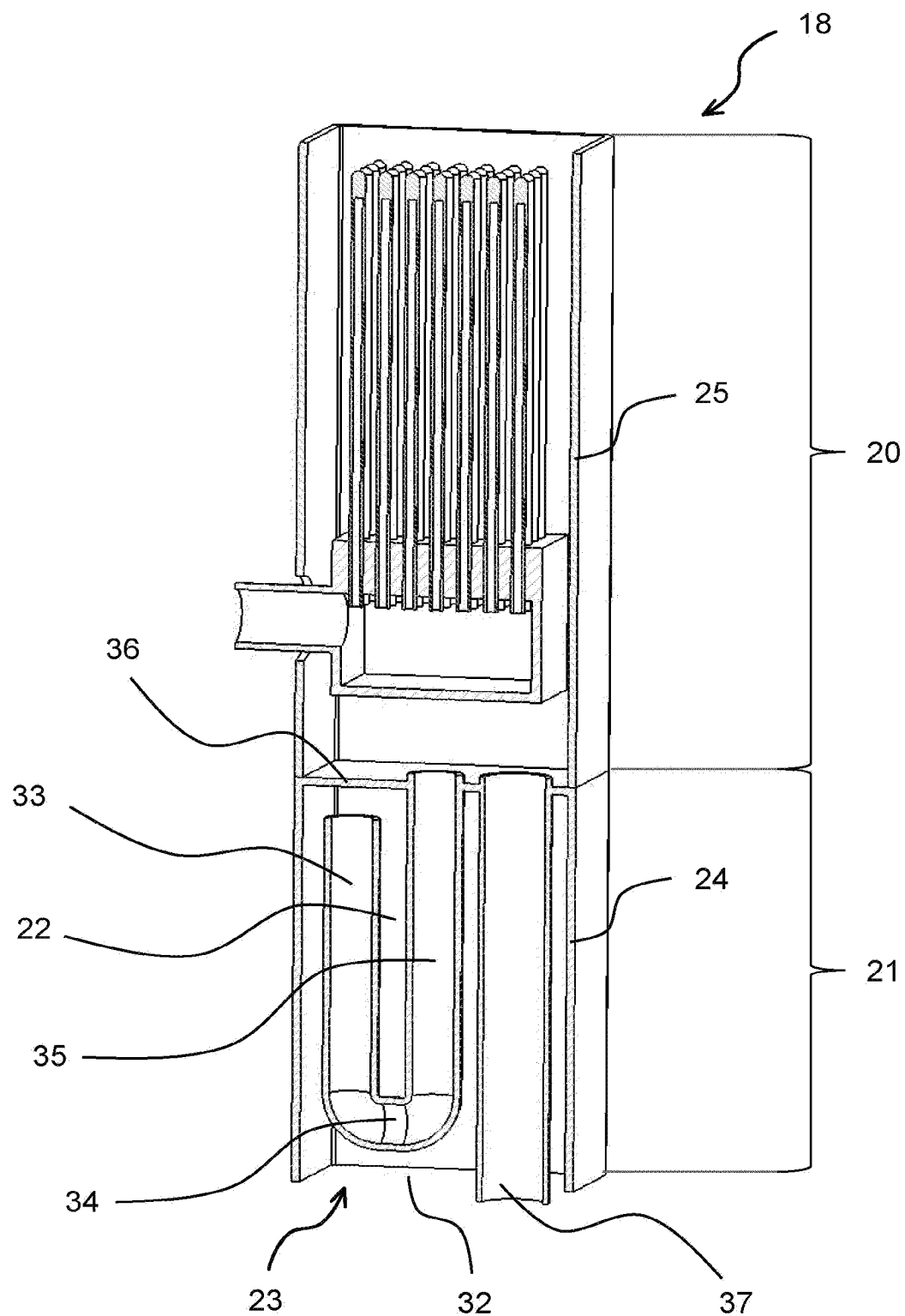

FIG. 3 shows a sectional view through the membrane unit 18 of the second membrane filter 17 according to the invention including the membrane element 20 and the geyser element 21 installed thereunder.

The outlet device 23 of the geyser element 21 has the following features: a gas lifting channel 33 configured to flow the gas from the gas collection cavity 22 downward and a deflection portion 34 at a bottom of the gas lifting channel 33 and configured for deflecting the outflowing gas upward. A flow out channel 35 adjoins the deflection portion 34 on top wherein the flow out channel 35 is configured to let the gas flow upward out of the geyser element 21. The rectangular geyser tube 24 includes a closed upper geyser wall 36 arranged on top and forming an upper boundary of the gas collection cavity 22. Since the geyser element 21 directly adjoins the membrane element 20 at a bottom thereof in the second membrane filter 17 according to the invention, the geyser element 21 includes a flow in tube 37 that facilitates an inflow of liquid to be filtered from below into the membrane element 20. The inflow tube 37 and the flow in channel 35 penetrate the upper geyser wall 36. The gas lifting channel 33, the deflection portion 34 and the flow out channel 35 jointly form the outlet device 23.

Figure 4A:
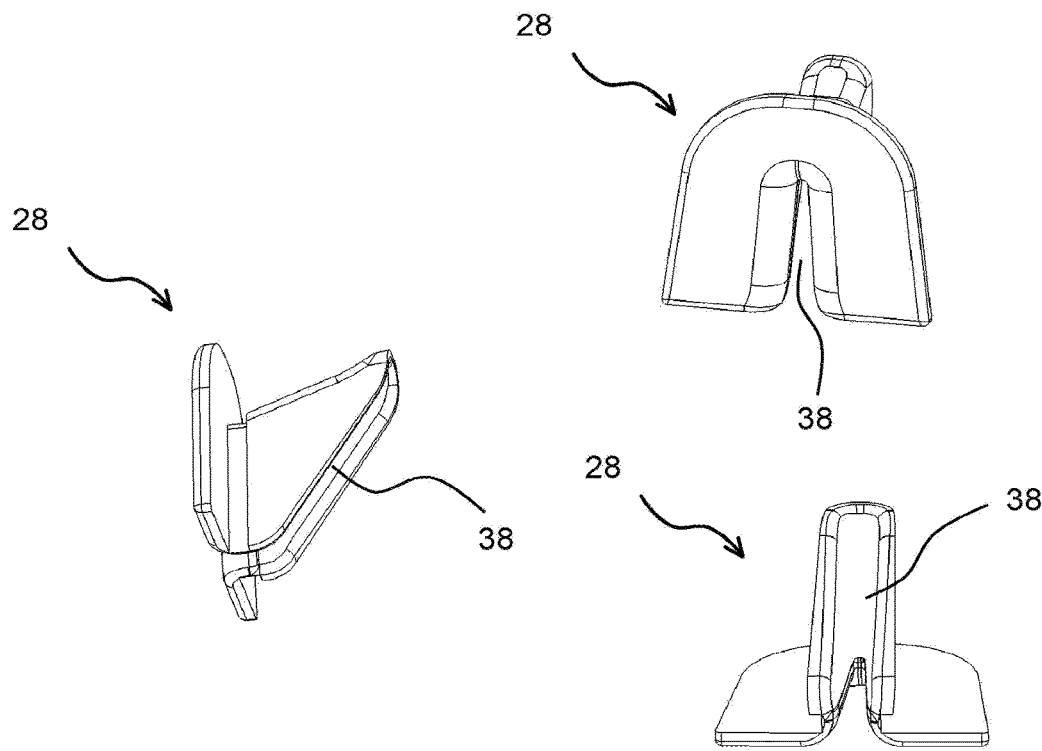

FIG. 4A shows three views of the beak shaped spout 28 of the second membrane filter 17 according to the invention. The beak shaped spout 28 includes a downward open flow through channel 38 configured to conduct the gas outward into an area offset from the tub 27.

Figure 4B:
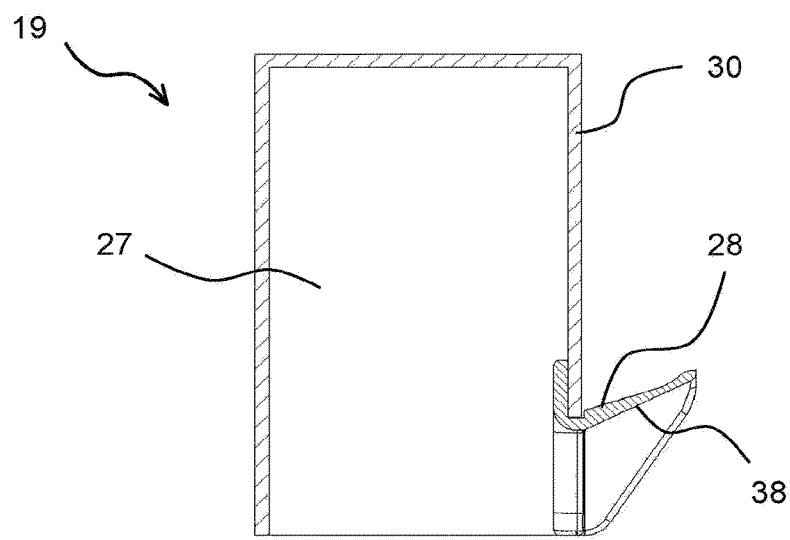

FIG. 4B shows an insertion of the beak shaped spout 28 into the wall 30 of the tub 27 of the gas distribution system 19. The flow through channel 38 is thus sloped upward on an outside of the tub 27. The flow through channel 38 is thus sloped upward on the outside of the tub 27 providing improved flow of the gas out of the tub 27.

Figure 5:
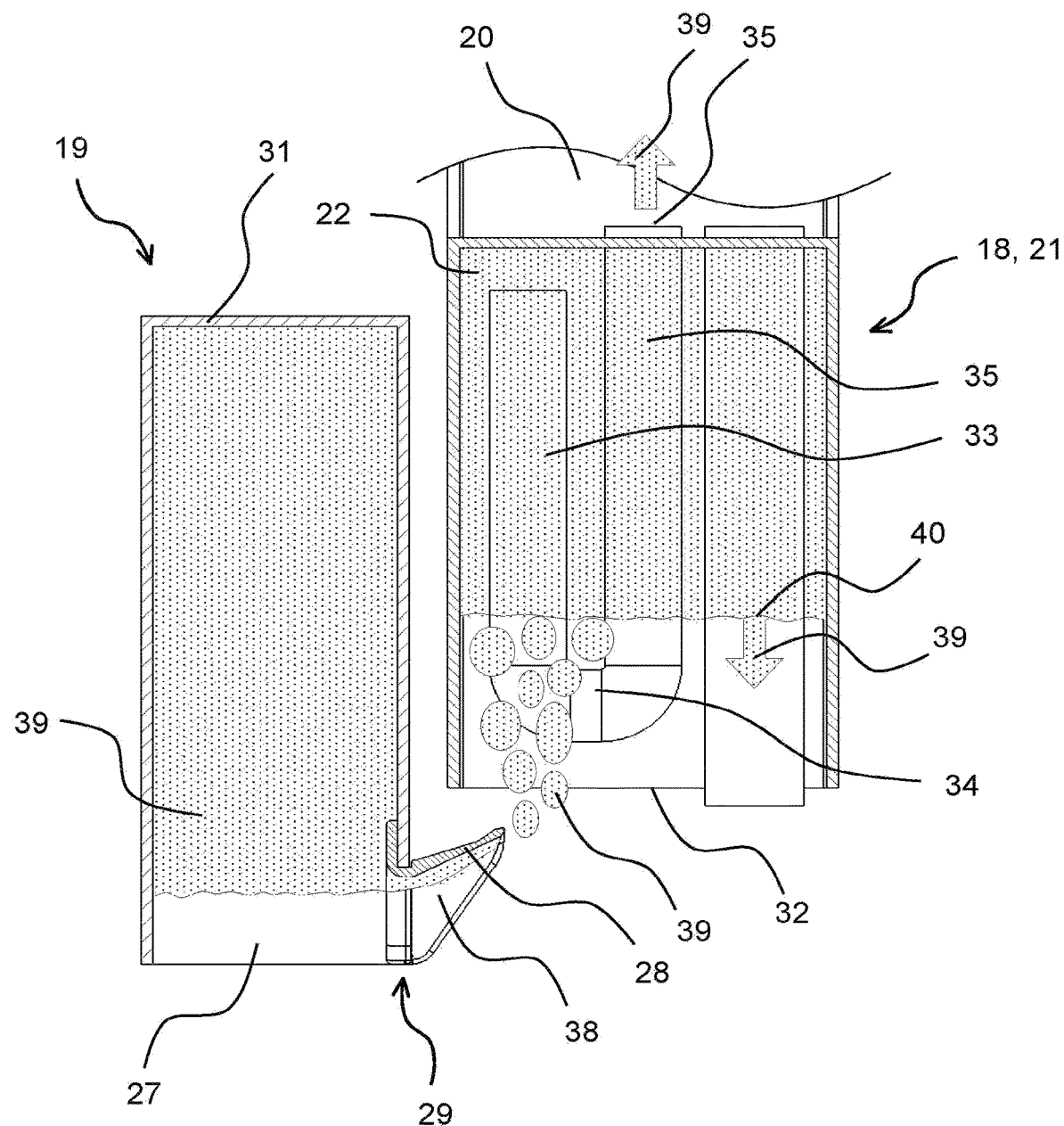

FIG. 5 illustrates operation of the second membrane filter 17 according to the invention and shows a detail sectional view of the gas distribution system 19 and the membrane unit 19, or through the geyser element 21 configured as a lower portion of the membrane unit 18. Thus, a gas 39 flows through the non-illustrated gas inlet 26 into the tub 27, fills the tub 27 and then continuously flows through the gas outlets 29 or the flow through channels 38 of the beak shaped spouts 28 from the tub 27 and thereafter through the gas inlet opening 32 into the geyser element 21. Thus, the gas inlet opening 32 is arranged below the base 31 of the tub 27.

While filling the gas collection cavity 22 of the geyser element 21 with the gas 39, a liquid level 40 in the gas collection cavity 22 drops until the liquid level 40 undercuts the flow out channel 35. Then, the gas 39 flows from above through the gas lifting channel 33 downward into the deflection portion 34 where the gas is deflected upward and subsequently flows through the flow out channel 35 on top out of the geyser. The gas 39 flows out of the gas collection cavity 22 until the gas collection cavity 22 is filled with liquid again from below. Then the filling process with the gas 39 recommences. Thus, the continuous gas flow into a bottom of the geyser element 21 creates a pulsating gas outflow on top from the geyser element 21 into the membrane element 20, installed there above in order to flush the non-illustrated membranes therein effectively with the gas 39.

Figure 6:
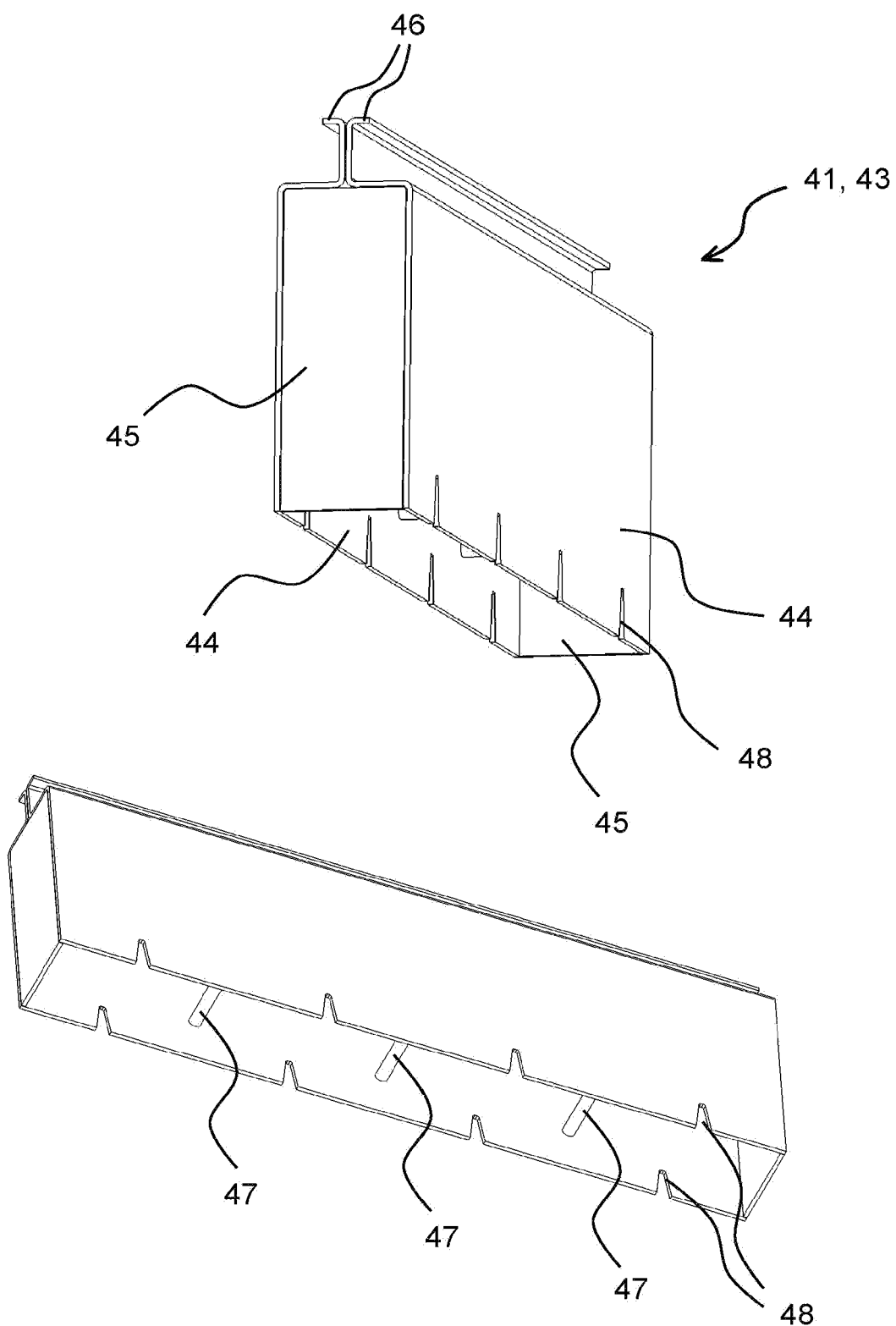
FIGS. 6-9 illustrate a views and detail sectional views of a third membrane filter according to the invention.
Figure 9:
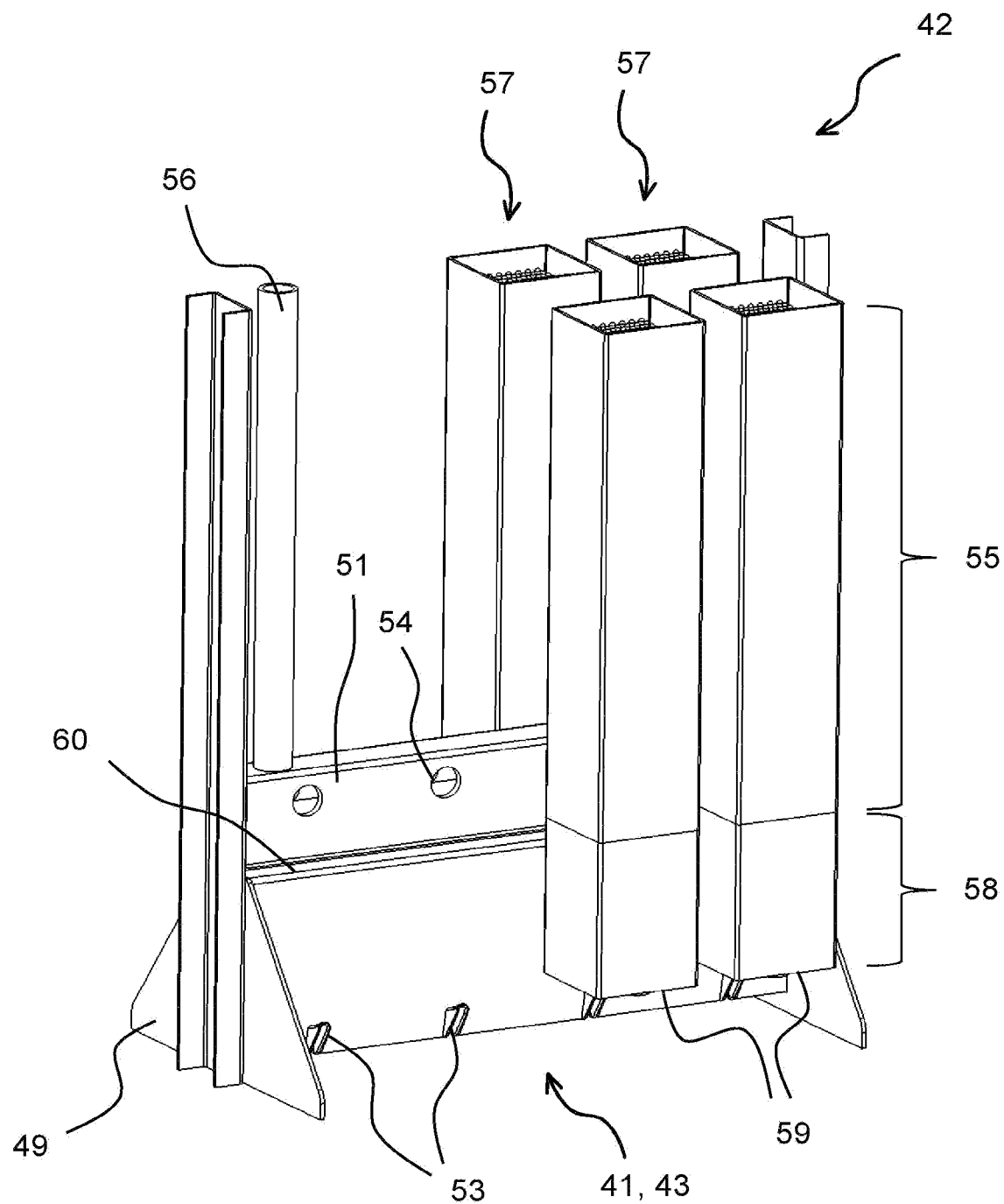

FIG. 6 shows two views of the tub 41 of a third membrane filter 42 illustrated in FIG. 9, wherein the tub forms part of a gas distribution system 43 of the third membrane filter 42. In this embodiment the tub 41 is made from two bent pieces of sheet metal 44 and two face elements 45 that are welded together. The two sheet metal pieces 44 thus form a T-profile 46 in a longitudinal direction of the tub 41 at a top of the tub 41. The lower view shows that the tub 41 includes three connection elements 47 at an inside between the bent sheet metal pieces 44, which stiffens the sheet metal pieces 44 during operation. Each of the sheet metal pieces thus includes downward open wedge-shaped gas outlets 48 configured to let the gas flow out of the tub 41.

Figure 7:
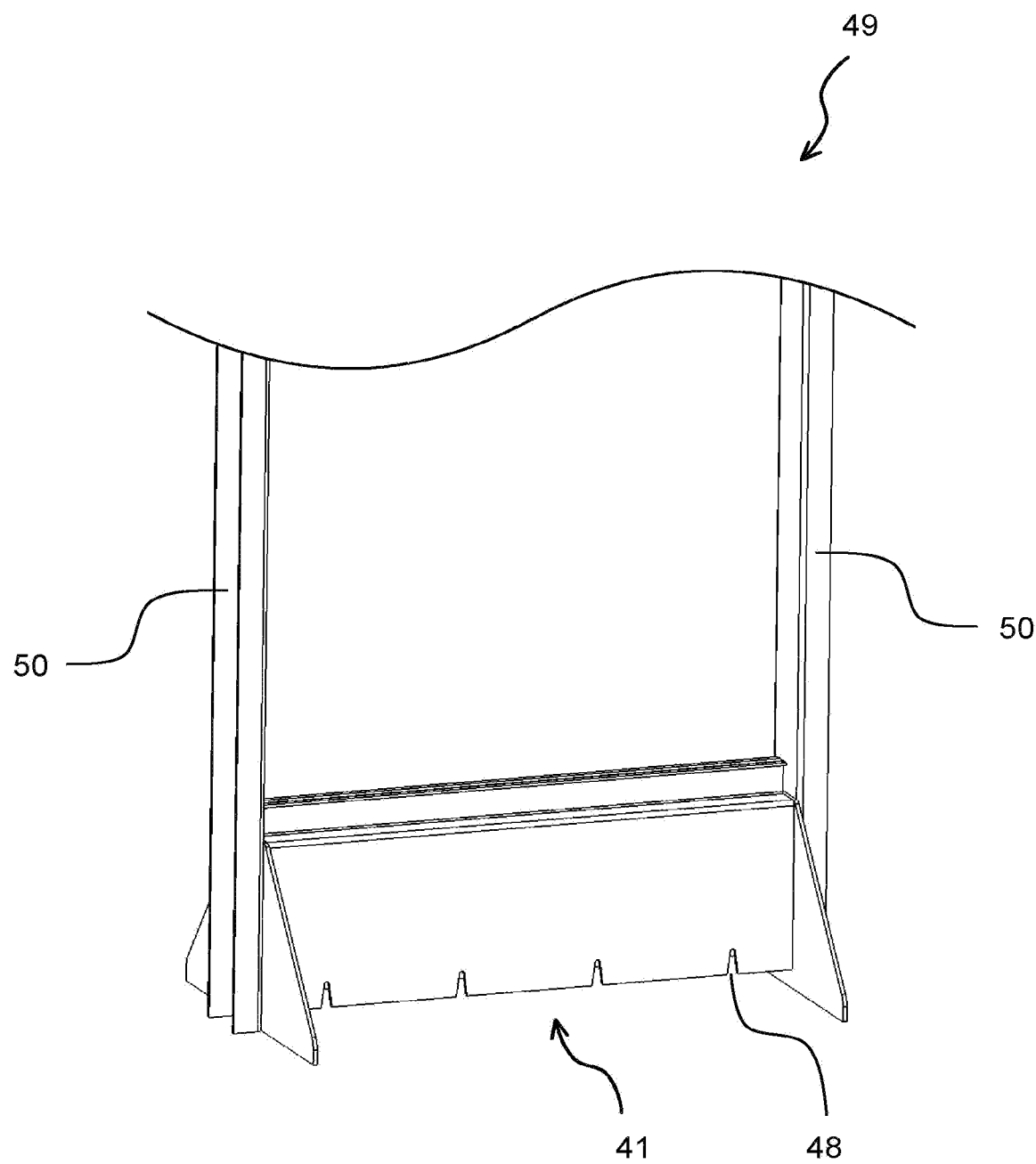

FIG. 7 shows a lower detail view of the third membrane filter 42 according to the invention illustrated in FIG. 9. Thus, the tub 41 is part of the frame 49 and bolted together with two side pieces 50 of the frame 49.

Figure 8:
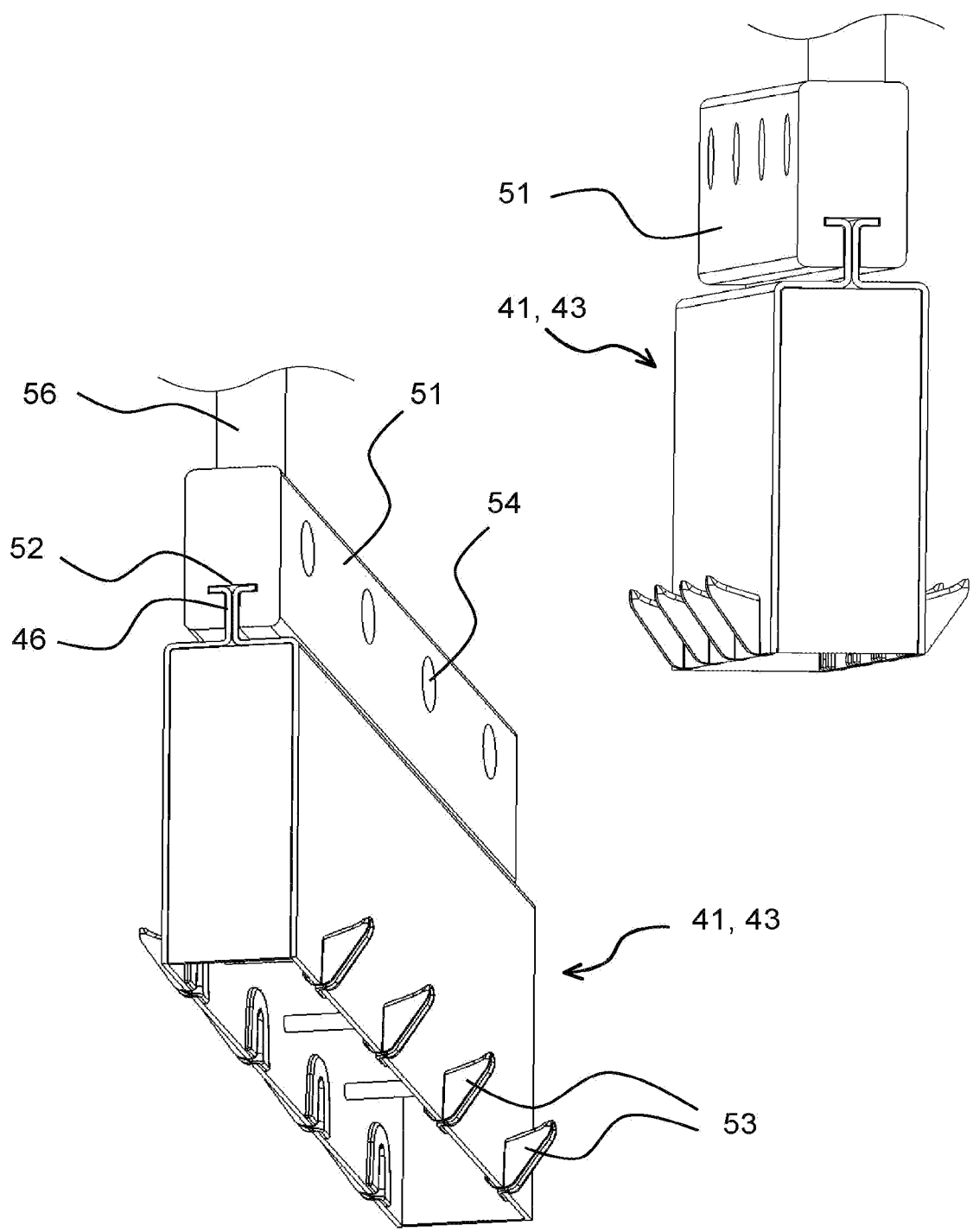

FIG. 8 shows two views of the tub 41 of the third membrane filter 42 according to the invention illustrated in FIG. 9 wherein a permeate collection channel 51 is connected on top of the third membrane filter 42 according to the invention. The permeate collection channel 51 has a dove tailed groove 52 that is slid over the T-profile 46. This creates a connection between the permeate collection channel 51 and the tub 41. Beak shaped spouts 53 are inserted into the gas outlets 48 and conduct the gas into an outer area of the tub 41. The permeate collection channel 51 includes eight permeate inlets 54, configured to laterally connect membrane elements 55. Additionally, the permeate collection channel 51 includes a permeate tube 56 configured to drain the permeate from the third membrane filter 42 according to the invention.

FIG. 9 shows the third membrane filter 42 according to the invention including four membrane units 57, wherein not all of the membrane units are shown for purposes of clarity. When operating the third membrane filter 42 includes eight membrane units 57. The membrane units 57 respectively include a membrane element 55 and a geyser element 58 installed thereunder. The membrane units 57 are mounted in the frame 59 and connected to the permeate inlets 54 of the permeate collection channel 51, with their membrane elements 55. The membrane units 57 are thus respectively positioned above a beak shaped spout 53 so that gas flowing out of each beak shaped spout 53 during operation flows directly from below into a gas inlet opening 59 of the membrane unit 57 positioned there above or of the geyser element 58.

According to the invention the gas inlet openings 59 are arranged below a base 60 of the tub 41 of the gas distribution system 43. The non-illustrated gas inlet of the third membrane filter according to the invention is a separate tube that lets gas flow from below into the tub 41.

REFERENCE NUMERALS AND DESIGNATIONS 1 first membrane filter
2 membrane unit
3 gas distribution system
4 membrane element
5 membrane
6 permeate collection cavity
7 base element
8 permeate outlet
9 permeate collection channel
10 rectangular tube
11 gas inlet
12 tub
13 base
14 gas outlet
15 wall
16 gas inlet opening
second membrane filter
18 membrane unit
19 gas distribution system
membrane element
21 geyser element
22 gas collection cavity
23 outlet device
24 rectangular geyser tube
rectangular tube
26 gas inlet
27 tub
28 beak shaped spout
29 gas outlet
30 wall
31 base
32 gas inlet opening
33 gas lifting channel
34 deflection portion
35 flow out channel
36 upper geyser wall
37 inlet tube
38 flow through channel
39 gas
40 liquid level
41 tub
42 third membrane filter
43 gas distribution system
44 sheet metal piece
45 face element
46 T-profile
47 connection element
48 gas outlet
49 frame
50 side piece
51 permeate collection channel
52 groove
53 beak shaped spout
54 permeate inlet
55 membrane element
56 permeate tube
57 membrane unit
58 geyser element
59 gas inlet opening
60 base

What is claimed is:

1. A membrane filter for submerged operation for filtering a liquid, the membrane filter comprising:
membrane units and a gas distribution system for distributing a gas to the membrane units and flushing the membrane units, wherein each of the membrane units includes a respective gas inlet opening and at least one membrane element, the at least one membrane element including:
membranes for filtering a liquid permeate from the liquid,
a permeate collection cavity connected to permeate sides of the membranes, and
a permeate outlet configured to drain the permeate from the permeate collection cavity,
the gas distribution system including:
exactly one gas outlet for each of the membrane units, the exactly one gas outlet configured to exhaust the gas from the gas distribution system into a respective gas inlet opening of each of the membrane units,
a downward open tub including a base arranged at a top of the tub and forming a boundary for the gas, and
a gas inlet configured to let the gas into the tub,
wherein the exactly one gas outlet is configured downward open in a lateral wall of the tub, and the membrane units respectively include a downward open gas collection cavity below the at least one membrane element, and the membrane units respectively include a geyser element below the at least one membrane element, the geyser element including an outlet device configured for a pulsating outlet of the gas in an upward direction from the gas collection cavity, and wherein the geyser element includes the respective gas inlet opening at a bottom of the geyser element.

2. The membrane filter according to claim 1, wherein the membrane units include the respective gas inlet opening below the base.

3. The membrane filter according to claim 1, wherein a beak shaped spout is inserted into the exactly one gas outlet and configured to conduct the gas outward into an area offset from the tub.

4. The membrane filter according claim 3, wherein the beak shaped spout includes a downward open flow through channel for the gas.

5. The membrane filter according to claim 4, wherein the flow through channel is sloped upward on an outside of the tub.

6. The membrane filter according to claim 1, wherein the tub is made from two bent sheet metal pieces and two face elements.

7. The membrane filter according to claim 6, wherein the tub internally includes at least one connection element between the bent sheet metal pieces.

8. The membrane filter according to claim 1, wherein the tub forms part of a frame that mounts the membrane units.

9. The membrane filter according to claim 1,
wherein a permeate collection channel is arranged on top of the tub, and
wherein the permeate outlet laterally adjoins the permeate collection channel.

10. A method for filtering a liquid in a membrane filter configured for submerged operation, the membrane filter including membrane units and a gas distribution system for distributing a gas to the membrane units and flushing the membrane units, wherein each of the membrane units includes a respective gas inlet opening and at least one membrane element, the method comprising in the at least one membrane element:
filtering a liquid permeate from the liquid by membranes;
the permeate flowing from the membranes into a permeate collection cavity connected to permeate sides of the membranes and from the permeate collection cavity into a permeate outlet from which the permeate is drained; and
the gas flowing from the gas distribution system into the respective gas inlet opening of each of the membrane units from exactly one respective gas outlet;
the gas flowing in the gas distribution system through a gas inlet into a downward open tub,
wherein the gas is delimited at a top of the downward open tub by a base of the tub, wherein the exactly one respective gas outlet is configured downward open in a lateral wall of the tub, and the membrane units respectively include a downward open gas collection cavity below the at least one membrane element, and the membrane units respectively include a geyser element below the at least one membrane element, the geyser element including an outlet device configured for a pulsating outlet of the gas in an upward direction from the gas collection cavity, and
wherein the geyser element includes the respective gas inlet opening at a bottom of the geyser element.

* * * * *